United States Patent

Wamprecht et al.

[11] Patent Number: 5,214,104
[45] Date of Patent: May 25, 1993

[54] COMPOSITIONS SUITABLE AS BINDERS AND THEIR USE IN COATING AND SEALING COMPOSITIONS

[75] Inventors: Christian Wamprecht, Neuss; Harald Blum, Wachtendonk; Josef Pedain, Cologne, all of Fed. Rep. of Germany

[73] Assignee: Bayer Aktiengesellschaft, Bayerwerk, Fed. Rep. of Germany

[21] Appl. No.: 750,178

[22] Filed: Aug. 26, 1991

[30] Foreign Application Priority Data

Sep. 1, 1990 [DE] Fed. Rep. of Germany ....... 4027742

[51] Int. Cl.$^5$ ............................................. C08F 8/14
[52] U.S. Cl. ................... 525/207; 525/327.6; 525/386
[58] Field of Search ................. 525/327.6, 207, 386

[56] References Cited

U.S. PATENT DOCUMENTS

| | | | |
|---|---|---|---|
| 4,128,521 | 12/1978 | Kroker et al. | 260/31.4 R |
| 4,190,569 | 2/1980 | Kroker et al. | 260/31.6 |
| 4,374,954 | 2/1983 | Labana et al. | 525/207 |
| 4,452,948 | 6/1984 | Marrion et al. | 525/207 |
| 4,710,543 | 12/1987 | Chattha et al. | 525/161 |
| 4,713,427 | 12/1987 | Chattha et al. | 525/510 |

FOREIGN PATENT DOCUMENTS

| | | |
|---|---|---|
| 316874 | 5/1989 | European Pat. Off. . |
| 358306 | 3/1990 | European Pat. Off. . |
| 1583316 | 1/1981 | United Kingdom . |
| 2148900 | 6/1985 | United Kingdom . |
| 8400771 | 3/1984 | World Int. Prop. O. . |

*Primary Examiner*—Bernard Lipman
*Attorney, Agent, or Firm*—Joseph C. Gil

[57] ABSTRACT

The present invention relates to compositions suitable for use as binders and containing A) 10 to 99 parts by weight of at least one copolymer which has a weight average molecular weight of 1500 to 75,000, is prepared from olefinically unsaturated compounds and contains
  i) 0.1 to 8.0% by weight of free hydroxyl groups and
  ii) 1 to 29% by weight of epoxide groups (calculated as $C_2H_3O$) and B) 1 to 90 parts by weight of at least one organic polyanhydride containing at least two cyclic carboxylic acid anhydride groups per molecule, provided that 0.1 to 10 anhydride groups of component B) are present for each epoxide group of component A).

The invention also relates to the use of the binder compositions as binders for thermosetting coating or sealing compositions, or, in the presence of catalysts, as binders for coating or sealing compositions which can be hardened at room temperature.

10 Claims, No Drawings

COMPOSITIONS SUITABLE AS BINDERS AND THEIR USE IN COATING AND SEALING COMPOSITIONS

BACKGROUND OF THE INVENTION

1. Field of the Invention

The present invention relates to new binder compositions based on copolymers containing epoxide and hydroxyl groups and also organic compounds which contain at least two cyclic carboxylic acid anhydride groups per molecule, and to their use in coating and sealing compositions.

2. Description of the Prior Art

The use of two-component systems based on organic compounds containing at least two intramolecular carboxylic acid anhydride groups per molecule and polyhydroxy compounds as binders for surface coatings and coating agents is known.

FR-A-2,392,092 describes coating compositions based on polymers containing hydroxyl groups and an ester-anhydride containing at least two anhydride groups per molecule. The ester-anhydride is a derivative of trimellitic anhydride.

EP-A-48,128 describes coating compositions based on a hydroxyl component containing at least two hydroxyl groups per molecule, an anhydride component containing at least two anhydride groups per molecule and if appropriate an amine component which acts as a catalyst. A disadvantage of these compositions is that their resistance to solvents is inadequate for high-quality top coats.

Both binder compositions which harden at room temperature and compositions which contain stoving binders based on carboxyl groups and epoxide groups are also already known.

DE-A-2,635,177 and DE-A-2,728,459 describe low-solvent stoving coating compositions based on a polyacrylate containing carboxyl groups, an epoxy resin containing at least two epoxide groups per molecule and a solvent mixture. The slowly progressing preliminary reaction between free carboxyl and free epoxide groups has an adverse effect in these systems and may result in an inadequate pot life for the coating compositions.

International patent application WO 84/00768 describes ternary thermosetting coating compositions based on (i) a polyacrylate containing epoxide and hydroxyl groups, (ii) a specific dicarboxylic acid anhydride and (iii) an amine resin cross linking agent. However, the anhydride component contains only one carboxylic acid anhydride group per molecule. As can be seen from the examples, coating agents based on these ternary systems can be hardened only at high hardening temperatures, for example about 130° C., even in the presence of catalysts. International patent applications WO 84/00770 and WO 84/00771 describe similar systems, with the difference that the first component contains only hydroxyl groups and a separate component containing epoxide groups is additionally also present.

The use of three-component systems based on organic compounds containing at least two intramolecular carboxylic acid anhydride groups per molecule, polyhydroxy compounds and polyepoxide compounds as binders for surface coatings and coating agents is also known. These systems are described in EP-A-134,691, EP-A-316,874 and EP-A-358,306.

Although the multi-component systems mentioned result in coatings with improved solvent resistance when compared to the above-mentioned two-component systems, they have the disadvantage that the individual components must be completely compatible with one another in order to ensure a good optical appearance of the coating. This compatibility problem limits the range of variation of the individual components.

An object of the present invention is to provide new binder compositions based on organic compounds containing carboxylic acid anhydride, hydroxyl and epoxide groups, which do not have the disadvantages mentioned for the systems of the prior art and in particular have a pot life which is adequate for surface coatings. It is an additional object of the present invention to provide binder compositions which, depending on the field of use, can be hardened at room temperature or elevated temperature to give clear, colorless, yellowing-resistant and solvent-resistant surface coatings.

These objects may be achieved with the binder compositions of the present invention which are described below in more detail.

A component A) which contains both free epoxide groups and free hydroxyl groups and a component B) which contains at least two cyclic carboxylic acid anhydride groups per molecule are present in the binder compositions according to the invention. Such binder compositions have not previously been described. The particular advantage of such systems lies in the fact that they contain the reactive groupings in the form of epoxide, hydroxyl and carboxylic acid anhydride groups in only two components A) and B), and that initially no free carboxyl groups, which are required for crosslinking with the epoxide groups of component A), are present in component B). These carboxyl groups are produced only from the reaction between the carboxylic acid anhydride groups and the hydroxyl groups in the presence of catalysts or heat.

These binder compositions thus have a considerably better storage stability at room temperature than comparable systems of the prior art which contain free carboxyl groups. Another advantage of the binder compositions according to the invention is that the crosslinking reaction is a so-called "double-cure" mechanism, i.e., the hydroxyl groups of component A) first react with the anhydride groups of component B) to open the anhydride ring and form carboxyl groups. This reaction provides initial crosslinking. However, the newly formed carboxyl groups can also react with the epoxide groups of component A) to provide additional crosslinking.

Coatings which have very high resistance to chemicals and solvents result from the binder compositions according to the invention due to the high crosslinking densities which can be obtained.

SUMMARY OF THE INVENTION

The present invention relates to compositions suitable for use as binders and containing A) 10 to 99 parts by weight of at least one copolymer which has a weight average molecular weight of 1500 to 75,000, is prepared from olefinically unsaturated compounds and contains
  i) 0.1 to 8.0% by weight of free hydroxyl groups and
  ii) 1 to 29% by weight of epoxide groups (calculated as $C_2H_3O$) and B) 1 to 90 parts by weight of at least one organic polyanhydride containing at least two cyclic carboxylic acid anhydride groups per molecule, provided that 0.1 to 10 anhydride groups of component B) are present for each epoxide group of component A).

The invention also relates to the use of the binder compositions as binders for thermosetting coating or sealing compositions, or, in the presence of catalysts, as binders for coating or sealing compositions which can be hardened at room temperature.

DETAILED DESCRIPTION OF THE INVENTION

Copolymer component A) is based on at least one copolymer which contains both chemically incorporated free hydroxyl groups in an amount of 0.1 to 8.0% by weight, preferably 0.4 to 4.0% by weight, and chemically incorporated epoxide groups in an amount of 1 to 29% by weight, preferably 5 to 25% by weight. The copolymers have a molecular weight (weight-average), which can be determined by gel permeation chromatography using polystyrene as the standard, of 1500 to 75,000, preferably 2000 to 60,000 and more preferably 3000 to 40,000. The copolymers are preferably based on mono-olefinically unsaturated monomers.

Three groups of olefinically unsaturated monomers are used for the preparation of the copolymers, i.e., a) olefinically unsaturated monomers containing hydroxyl groups, b) olefinically unsaturated monomers containing epoxide groups and c) non-functional olefinically unsaturated monomers which are free from hydroxyl groups and epoxide groups.

Monomers a) are employed in an amount of 0.5 to 70, preferably 5 to 40 parts by weight; monomers b) are employed in an amount of 3 to 97, preferably 5 to 50 parts by weight; and monomers c) are employed in an amount of 0 to 96.5, preferably 10 to 90 parts by weight, provided that the sum of the amounts monomers a) to c) is 100 parts by weight, based on the weight of monomers a) to c).

The contents of the individual monomers in the mixture for the copolymerization reaction are furthermore chosen so that the above-mentioned amounts of chemically incorporated hydroxyl groups and epoxide groups are present in the copolymers. The content of these groups in the copolymers corresponds to the content of the groups in the monomer mixture, since it can be assumed that the chemical composition of the copolymers corresponds to the chemical composition of the monomer mixture.

Monomers a) are mono-olefinically unsaturated alcohols, which preferably have a molecular weight of 58 to 500 and preferably contain aliphatically bound hydroxyl groups. Suitable alcohols include the known hydroxyalkyl esters of acrylic and methacrylic acid having a molecular weight of 116 to 200 such as hydroxyethyl (meth)acrylate, 2- and 3-hydroxypropyl (meth)acrylate, 1-methyl-2-hydroxyethyl (meth)acrylate and 4-hydroxybutyl (meth)acrylate; hydroxyalkyl vinyl ethers such as 2-hydroxyethyl vinyl ether and 4-hydroxybutyl vinyl ether; allyl alcohol; and hydroxy derivatives of (meth)acrylamide such as N-(3-hydroxy-2,2-dimethylpropyl)-(meth)acrylamide; reaction products of glycidyl (meth)acrylate with monocarboxylic acids; reaction products of (meth)acrylic acid with monoepoxide compounds; and reaction products of the above-mentioned olefinically unsaturated compounds containing OH functional groups with ε-caprolactone or butyrolactone.

Compounds which are suitable for use as monomer b) include glycidyl acrylate, glycidyl methacrylate or allyl glycidyl ether; the first two compounds being preferred.

Compounds which are suitable for use as monomer c) are known and have a molecular weight of 86 to 400. These compounds are preferably mono-olefinically unsaturated monomers which are free from hydroxyl groups and epoxide groups and include the compounds which have previously been used as monomers in the processes of the above-mentioned prior art.

Examples of these compounds include esters of acrylic and methacrylic acid such as methyl acrylate, ethyl acrylate, n-butyl acrylate, isobutyl acrylate, tert.-butyl acrylate, 2-ethylhexyl acrylate, cyclohexyl methacrylate, methyl methacrylate, n-butyl methacrylate, isobutyl methacrylate and 2-ethylhexyl methacrylate; vinyl aromatics such as styrene, vinyltoluene, α-methylstyrene, α-ethylstyrene and nuclear-substituted diethylstyrenes, isopropylstyrenes, butylstyrenes and methoxystyrenes, which may optionally be present as isomer mixtures; vinyl ethers such as ethyl vinyl ether, n-propyl vinyl ether, isopropyl vinyl ether, n-butyl vinyl ether and isobutyl vinyl ether; and vinyl esters such as vinyl acetate, vinyl propionate and vinyl butyrate.

It is of course possible in each case to use mixtures of monomers a) to c) for the copolymerization.

The preparation of the copolymers can be carried out by copolymerization of monomers a) to c) by known free radical polymerization processes such as bulk or solution polymerization.

The monomers are copolymerized at temperatures of 60° to 180° C., preferably 80° to 160° C., in the presence of free-radical formers and optionally molecular weight regulators.

The copolymerization is preferably carried out in inert solvents. Examples of suitable solvents include aromatics such as benzene, toluene and xylene; esters such as ethyl acetate, butyl acetate, hexyl acetate, heptyl acetate, methylglycol acetate, ethylglycol acetate and methoxypropyl acetate; ethers such as tetrahydrofuran, dioxane and diethylene glycol dimethyl ether; and ketones such as acetone, methyl ethyl ketone, methyl isobutyl ketone, methyl n-amyl ketone and methyl isoamyl ketone.

The copolymerization can be carried out continuously or discontinuously. The monomer mixture and the initiator are usually metered uniformly and continuously into a polymerization reactor, and at the same time the corresponding amount of polymer is removed continuously.

Copolymers which are substantially chemically uniform can preferably be prepared in this way. Copolymers which are substantially chemically uniform can also be prepared by adding the reaction mixture to a stirred kettle at a constant rate, without the polymer being removed.

It is also possible for a portion of the monomers, optionally dissolved in the above-mentioned solvents, to be initially introduced into the reaction vessel and for the remaining monomers and auxiliaries to be introduced into this mixture, together or separately, at the reaction temperature.

The polymerization is preferably carried out under atmospheric pressure, but pressures of up to 20 bar can also be used.

The initiators are employed in amounts of 0.05 to 15% by weight, based on the total amount of monomers. Suitable free so radical initiators are known and include aliphatic azo compounds such as azodiisobutyronitrile, azo-bis-2-methylvaleronitrile, 1,1'-azo-bis-1-cyclohexanenitrile and 2,2'-azo-bis-isobutyric acid alkyl esters; symmetric diacyl peroxides such as acetyl, propionyl and butyryl peroxide; benzoyl peroxides substituted by bromine, nitro, methyl or methoxy groups; and symmetric peroxydicarbonates such as diethyl, diisopropyl, dicyclohexyl and dibenzoyl peroxydicarbonate; tert.-butyl peroxy 2-ethyl-hexanoate; tert.-butyl perbenzoate; hydroperoxides such as tert.-butyl hydroperoxide and cumene hydroperoxide; dialkyl peroxides such as di-cumylperoxide; tert.-butyl cumyl peroxide; and di-tert.-butyl peroxide.

Known regulators can be employed in the preparation for regulation of the molecular weight of the copolymers. Examples which may be mentioned are tert.-dodecylmercaptan, n-dodecylmercaptan and diisopropylxanthogen disulphide. The regulators can be added in amounts of 0.1 to 10% by weight, based on the total weight of the monomers.

The copolymer solutions obtained during the copolymerization reaction can be employed without further working up for the preparation of the binder compositions according to the invention.

Component B) is based on at least one organic compound containing at least two cyclic carboxylic acid anhydride groups per molecule. The content of carboxylic acid anhydride groups in these compounds (calculated as $C_4O_3$, molecular weight=96) is 5 to 88%, preferably 6 to 30% by weight. Examples of suitable compounds are trimellitic anhydride adducts corresponding to formula I

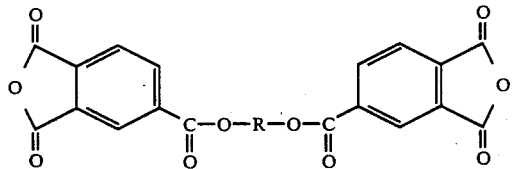

wherein R represents a divalent hydrocarbon radical which optionally contains ether-oxygen atoms and has 2 to 12 carbon atoms. Examples of suitable compounds of formula I are the trimellitic anhydride esters of ethylene glycol, propylene glycol, diethylene glycol, triethylene glycol, neopentylglycol, glycerol and trimethylolpropane.

Other suitable polyanhydrides include benzophenone tetracarboxylic dianhydrides corresponding to formula II

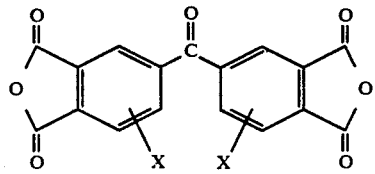

wherein X may be the same or different in the two aromatic nuclei and represents hydrogen, halogen, —$NO_2$, —COOH or —$SO_3H$. Examples of these compounds include 3,3',4,4'-benzophenone tetracarboxylic dianhydride; 2-bromo-3,3',4,4'-benzophenone tetracarboxylic dianhydride or 5-nitro-3,3',4,4'-benzophenone tetracarboxylic dianhydride.

Also suitable is 1,2,4,5-benzenetetracarboxylic dianhydride which corresponds to formula III

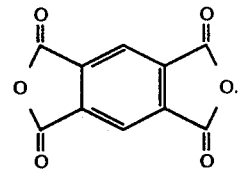

Preferably component B) is based on at least one copolymer of olefinically unsaturated monomers which contain a statistical average of at least 2 cyclic carboxylic acid anhydride groups per molecule. These are preferably copolymers of maleic anhydride and/or itaconic anhydride with the comonomers previously set forth as suitable for use as monomer c) for the preparation of component A) and have already been disclosed above as examples. Copolymers based on maleic anhydride, styrene and alkyl esters of acrylic and/or methacrylic acid are particularly suitable. The copolymers preferably have a weight average molecular weight, determined by the method previously set forth, of 1500 to 75,000, preferably 2000 to 50,000. They are prepared in the same manner as copolymers A).

The amounts of components A) and B) are chosen so that 0.1 to 10, preferably 0.5 to 5 and more preferably 0.8 to 1.5 anhydride groups of component B) are present for each epoxide group of component A).

The binder compositions according to the invention are useful binders for coating or sealing compositions. Based on the reactivity of cyclic carboxylic acid anhydride groups to hydroxyl groups under the action of heat and the reactivity of the carboxylic acid groups formed in this reaction towards epoxide groups, the binder compositions according to the invention are suitable, without further additives, as binders for thermosetting coating or sealing compositions. The compositions can be hardened at a temperature of 120° to 200° C. within a period of about 10 to 60 minutes. Since no free carboxyl groups are initially present in the binder compositions, the compositions have very good storage stability at room temperature. However, after the addition of suitable catalysts, they can also be used as binders for coating and sealing compositions which harden at room temperature.

Room temperature cure requires a catalyst component C) which increases the reactivity of the acid anhydride groups to hydroxyl groups to the extent that a crosslinking reaction occurs at low temperatures, e.g., room temperature. Examples of such catalysts are compounds containing tertiary amino groups. The catalysts can be compounds which are either inert towards acid anhydride groups or epoxide groups or compounds which contain, in addition to the tertiary amino group, a group which is reactive towards acid anhydride groups or epoxide groups such as a hydroxyl group or primary or secondary amino group. In this latter case, catalyst component C) is chemically incorporated into binder components A) and/or B) by reaction of its reactive group with epoxide groups and/or anhydride groups to form secondary or tertiary amino groups, together with the formation of an additional hydroxyl group (from the epoxide group) or half-ester and/or half-amide structures (from the anhydride group).

Examples of compounds which are suitable for use as catalyst C) are tertiary amines having a molecular weight of 73 to 300 such as ethyldimethylamine, diethylmethylamine, triethylamine, ethyldiisopropylamine, tri-n-butylamine, 1-methylpyrrolidine, 1-methylpiperidine, 1,4-dimethylpiperazine, 1,4-diazabicyclo(2,2,2)octane or 1,8-diazabicyclo(5.4.0)-undec-7-ene, N,N-dimethylethanolamine, N,N-diethylpropanolamine, N,N-di-n-butylethanolamine, 1-amino-3-(diethylamino)-propane and 1-amino-2-(diethylamino)ethane. It is also possible to employ mixtures of these tertiary amines as component C).

It is also possible to employ organic compounds which contain at least one tertiary amino group and have a molecular weight of more than 300. Such substances include reaction products of olefinically unsaturated compounds containing (meth)acrylate groups with secondary amines, for example reaction products of 1 mole of trimethylolpropane triacrylate with 3 moles of di-n-butylamine.

Reaction products of polyisocyanates with N,N-dialkylalkanolamines, such as the reaction product of 1 mole of biuret group-containing polyisocyanate based on hexamethylene diisocyanate and 3 moles of N,N-dimethylethanolamine are also suitable.

Compounds which also contain a hydroxyl group in addition to a tertiary amino group can also be prepared, for example, by the reaction of compounds containing an epoxide group with secondary amines such as the reaction product of ethylhexyl glycidyl ether with di-n-butylamine.

In addition to compounds containing tertiary amino groups, compounds which contain quaternary ammonium groups such as (2-hydroxyethyl)-trimethylammonium chloride, tetrabutylammonium chloride, tetrabutylammonium bromide, tetraethylammonium bromide and tetrahexylammonium bromide, are also suitable as catalyst component C).

Tin compounds (such as tin dioctoate, dibutyltin dilaurate, dibutyltin diacetate and dibutyltin dichloride) as well as phosphorus compounds such as (triphenyl-phosphine) can also be employed as catalyst component C).

The coating or sealing compositions containing the compositions according to the invention as binders may also contain other auxiliaries and additives D) such as solvents or diluents, flow auxiliaries, antioxidants, UV absorbers and pigments.

The coating or sealing compositions are prepared either by mixing starting components A), B), C) and optionally D) with each other or using only starting components A), B) and optionally D) as described below, depending on the intended use. If solvents or diluents are also used as component D), these may be added to components A), B) and optionally C). It is also possible to add the solvents or diluents during the preparation of components A) and B) as previously described for the preparation of the copolymers.

Solvents or diluents are used in amounts which are necessary to establish suitable processing viscosities.

The solids content of the compositions according to the invention is preferably 20 to 80% by weight. However, it is also possible for the solvent or diluent content to be reduced still further by using suitable low molecular weight copolymers, in particular for the preparation of sealing compositions containing the binder compositions according to the invention.

The binder compositions according to the invention can be used directly, without further additives, for the production of clear coatings. The solvents employed in the preparation of coatings using the binder compositions according to the invention may be the same as those which were used for the preparation of copolymers A) and optionally B), so that no further solvents have to be added during the preparation of the coating compositions. If the copolymers mentioned have been prepared in the absence of solvents or are in solvent-free form, the solvents may be added during the preparation of the coating.

The known auxiliaries and additives from the coatings industry which have previously been mentioned may also be used during the preparation of the coating compositions. In the case of the preparation of sealing compositions, which are often used in solvent-free form, the use of solvents may be omitted. The ready-to-use systems obtained in this manner can be applied as coating compositions or sealing compositions to any desired substrates, which may optionally have been pretreated, by known methods such as spraying, brushing, dipping, flooding, casting or rolling. Suitable substrates include metal, wood, glass, ceramic, stone, concrete, plastics, textiles, leather, cardboard and paper.

In the following examples, all parts and percentages parts are by weight unless otherwise indicated.

EXAMPLES

I. General preparation procedures for copolymers $A_1$ to $A_7$ containing hydroxyl and epoxide groups and copolymers $B_1$ to $B_5$ containing anhydride groups Part I was initially introduced into a 3 l reaction vessel with a stirring, cooling and heating device and was heated up to the reaction temperature. Part II (addition over a period of 2 hours in total) and part III (addition over a period of 2.5 hours in total) were then metered into the vessel beginning at the same time. The mixture was then subsequently stirred at the reaction temperature for 2 hours. The reaction temperatures and compositions of parts I to III of copolymers $A_1$ to $A_7$ containing hydroxyl and epoxide groups are set forth in Table I, together with the characteristic data of the resulting products; the corresponding data for copolymers $B_1$ to $B_5$ containing anhydride groups are set forth in Table II.

TABLE I

| Copolymers containing hydroxyl and epoxide groups (Amounts data in g) | | | | | | | |
|---|---|---|---|---|---|---|---|
| Copolymer | $A_1$ | $A_2$ | $A_3$ | $A_4$ | $A_5$ | $A_6$ | $A_7$ |
| Part I | | | | | | | |
| Butyl acetate | 680 | 680 | 680 | | | | |
| Hexyl acetate | | | | | | | 680 |
| Xylene | | | | 680 | 680 | 680 | |
| Part II | | | | | | | |
| Butyl acrylate | 232 | | | 232 | | 410 | |

TABLE I-continued

Copolymers containing hydroxyl and epoxide groups (Amounts data in g)

| Copolymer | $A_1$ | $A_2$ | $A_3$ | $A_4$ | $A_5$ | $A_6$ | $A_7$ |
|---|---|---|---|---|---|---|---|
| 2-Ethylhexyl acrylate | | | | | 586 | | |
| Methyl methacrylate | 290 | | 410 | | | 468 | |
| Butyl methacrylate | | 290 | | | | | |
| Styrene | 232 | 464 | 352 | 348 | 176 | | 464 |
| Glycidyl methacrylate | 174 | 232 | 292 | 348 | 234 | 118 | 232 |
| 2-Hydroxyethyl acrylate | | | 118 | | 176 | | |
| 2-Hydroxyethyl methacrylate | | 174 | | | | 176 | 174 |
| Hydroxypropyl methacrylate* | 232 | | | 232 | | | |
| Part III | | | | | | | |
| tert.-Butyl peroxy-2-ethyl-hexanoate (70% strength) | 86 | 86 | 70 | 86 | 70 | 70 | |
| Di-tert.-butyl peroxide | | | | | | | 60 |
| Butyl acetate | 74 | 74 | 78 | | | | |
| Hexyl acetate | | | | | | | 100 |
| Xylene | | | | 74 | 78 | 78 | |
| Polymerization temperature (°C.) | 125 | 125 | 125 | 135 | 135 | 110 | 160 |
| Solids content (%) | 59.6 | 59.7 | 60.6 | 59.7 | 59.9 | 60.2 | 59.2 |
| Viscosity at 23° C. (mPa · s) | 2824 | 4017 | 14061 | 2615 | 270 | 7845 | 2248 |
| Hydroxyl group content** (%) | 1.4 | 1.1 | 0.9 | 1.4 | 1.3 | 1.2 | 1.1 |
| Epoxide group content** ($C_2H_3O$, %) | 2.6 | 3.5 | 4.4 | 5.3 | 3.5 | 1.8 | 3.5 |

*Mixture of 1-methyl-2-hydroxyethyl and 2-hydroxypropyl isomers in a ratio of 1:3
**based on the solution

TABLE II

Compolymers containing anhydride groups (amounts data in g)

| Copolymers | $B_1$ | $B_2$ | $B_3$ | $B_4$ | $B_5$ |
|---|---|---|---|---|---|
| Part I | | | | | |
| Butyl acetate | 680 | 680 | 680 | 680 | 680 |
| Part II | | | | | |
| Ethyl acrylate | | 322 | | | |
| Butyl acrylate | | | 351 | 410 | |
| 2-Ethylhexyl acrylate | | | | | 351 |
| Methyl methacrylate | 468 | 469 | 410 | 263 | 293 |
| Butyl methacrylate | 410 | | | | |
| Styrene | 176 | 234 | 234 | 293 | 293 |
| Maleic anhydride | 117 | 146 | 176 | 205 | 234 |
| Part III | | | | | |
| tert.-Butyl peroxy-2-ethyl-hexanoate[1)] | 70 | 70 | 70 | 70 | 70 |
| Butyl acetate | 79 | 79 | 79 | 79 | 79 |
| Polymerization temperature (°C.) | 125 | 110 | 125 | 125 | 125 |
| Solids content (5) | 59.9 | 60.4 | 60.1 | 60.2 | 59.9 |
| Viscosity at 23° C. (mPa · s) | 9819 | 12426 | 7194 | 3975 | 8473 |
| Anhydride content of the solution (calculated as $C_4O_3$, %) | 5.7 | 7.2 | 8.6 | 10.0 | 11.5 |

[1)]70% by weight solution in isododecane

II. Preparation of coating compositions according to the invention a) Film hardening under stoving bonds

Copolymers $A_1$ to $A_7$ were mixed with one of copolymers $B_1$ to $B_5$ and if necessary reduced to a processable viscosity by the addition of an organic solvent or diluent. The films were drawn onto test sheets at a wet film thickness being 150 μm using a film drawer. After aerating at room temperature for 5 minutes, the coated test sheets were stored at 150° C. for 30 minutes. They were then cooled to room temperature. Clear, colorless, crosslinked coatings having good optical and mechanical properties were obtained in this manner.

The resistance to solvents was tested by means of a rubbing test using a swab impregnated with methyl isobutyl ketone (MIBK). The number of double rubs during which the coating remained without visible change is set forth. No more than 200 double rubs were performed per film.

The compositions of the binders and their resistance to solvents, based on the degree of crosslinking, are set forth in Table III.

TABLE III

| Use Example | 1 | 2 | 3 | 4 | 5 | 6 | 7 |
|---|---|---|---|---|---|---|---|
| Copolymer | 20.0 g $A_1$ | 20.0 g $A_2$ | 20.0 g $A_3$ | 20.0 g $A_4$ | 20.0 g $A_5$ | 20.0 g $A_6$ | 20.0 g $A_7$ |
| Copolymer | 10.3 g $B_5$ | 15.6 g $B_4$ | 22.2 g $B_3$ | 32.9 g $B_2$ | 27.7 g $B_1$ | 11.4 g $B_5$ | 13.0 g $B_4$ |
| Butyl acetate | 5.0 g | 5.0 g | 10.0 g | 10.0 g | 10.0 g | 5.0 g | 5.0 g |
| MIBK rubbing test: Number of double rubs | 180 | 160 | 200 | 170 | 120 | 160 | 130 | b) Film hardening at room temperature

Copolymers $A_1$ to $A_7$ were mixed with one of copolymers $B_1$ to $B_5$ and a tertiary amine at room temperature, and if necessary the mixture was reduced to a processable viscosity by the addition of an organic solvent or diluent. The films were drawn onto test sheets at a wet film thickness of being 150 μm using a film drawer. The films, which were cured at room temperature were all thoroughly dried and free from tackiness within 60 minutes. After aging at room temperature for 24 hours, crosslinked films were obtained which were clear and colorless and had good optical and mechanical properties.

The coating compositions all had a pot life of several (>3) hours. The resistance to solvents was determined as described above.

The compositions of the binders and their resistance to solvents, based on the degree of crosslinking, are set forth in Table IV.

TABLE IV

| Use Example | 8 | 9 | 10 | 11 | 12 | 13 | 14 |
|---|---|---|---|---|---|---|---|
| Copolymer | 20.0 g $A_1$ | 20.0 g $A_2$ | 20.0 g $A_3$ | 20.0 g $A_4$ | 20.0 g $A_5$ | 20.0 g $A_6$ | 20.0 g $A_7$ |
| Copolymer | 10.3 g $B_5$ | 15.6 g $B_4$ | 22.2 g $B_3$ | 32.9 g $B_2$ | 27.7 g $B_1$ | 11.4 g $B_5$ | 13.0 g $B_4$ |
| DMEA* | 0.1 g | 0.1 g | 0.1 g | 0.1 g | 0.1 g | | |
| TEA** | | | | | | 0.1 g | 0.1 g |
| Butyl acetate | 5.0 g | 5.0 g | 10.0 g | 10.0 g | 10.0 g | 5.0 g | 5.0 g |
| MIBK rubbing test: Number of double rubs | 160 | 200 | 180 | 100 | 140 | 130 | 100 |

*N,N-Dimethylethanolamine
**Triethylamine

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is suitable for use as a binder and comprises
A) 10 to 99 parts by weight of at least one copolymer which has a weight average molecular weight of 1500 to 75,000, is prepared from olefinically unsaturated compounds and contains
   i) 0.1 to 8.0% by weight of free hydroxyl groups and
   ii) 1 to 29% by weight of epoxide groups (calculated as $C_2H_3O$) and
B) 1 to 90 parts by weight of at least one organic polyanhydride containing at least two cyclic carboxylic acid anhydride groups per molecule,
provided that 0.1 to 10 anhydride groups of component B) are present for each epoxide group of component A).

2. The composition of claim 1 wherein component A) comprises a copolymer which is the free radical initiated copolymerization product of
   a) 0.5 to 70 parts by weight of olefinically unsaturated monomers containing hydroxyl groups,
   b) 3 to 97 parts by weight of olefinically unsaturated monomers containing epoxide groups and
   c) 0 to 96.5 parts by weight of olefinically unsaturated monomers which is free from hydroxyl groups and epoxide groups,
provided that the sum of components a) to c) is 100 parts by weight, based on the weight of components a) to c).

3. The composition of claim 2 wherein component a) comprises a hydroxyalkyl ester of acrylic or methacrylic acid.

4. The composition of claim 2 wherein component b) comprises glycidyl acrylate, glycidyl methacrylate and/or allyl glycidyl ether.

5. The composition of claim 3 wherein component b) comprises glycidyl acrylate, glycidyl methacrylate and/or allyl glycidyl ether.

6. The composition of claim 1 wherein component B) comprises a tetracarboxylic dianhydride corresponding to formulas I, II or III

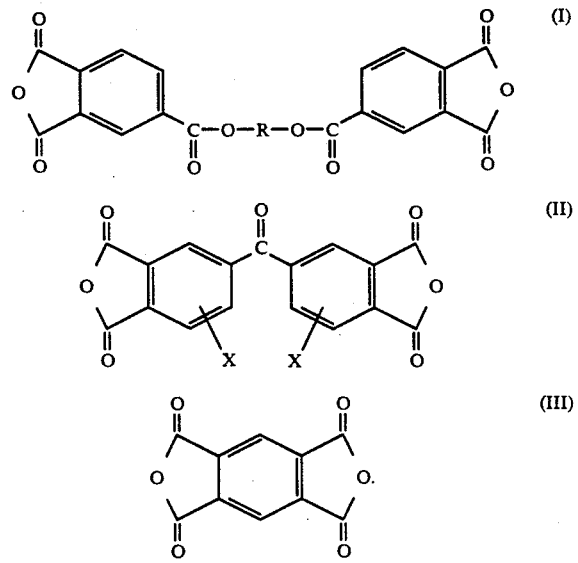

wherein
R represents a divalent hydrocarbon radial which has 2 to 12 carbon atoms and optionally contains etheroxygen atoms and
X may be the same or different in the two aromatic nuclei and represents hydrogen, halogen, $-NO_2$, $-COOH$ or $-SO_3H$.

7. The composition of claim 1 wherein component B) comprises a copolymer containing anhydride groups and obtained by free radical initiated copolymerization of olefinically unsaturated monomers.

8. The composition of claim 6 wherein said anhydride groups are incorporated by monomers comprising maleic anhydride and/or itaconic anhydride.

9. A heat-curable coating or sealing composition which comprises the composition of claim 1 as binder.

10. A coating or sealing composition which may be hardened at room temperature and comprises the composition of claim 1 as binder and a catalyst which accelerates the reaction between acid anhydride groups and hydroxyl groups.

* * * * *